Nov. 27, 1962    W. G. PFANN    3,065,636
PRESSURE TRANSDUCERS
Filed May 10, 1960    2 Sheets—Sheet 1
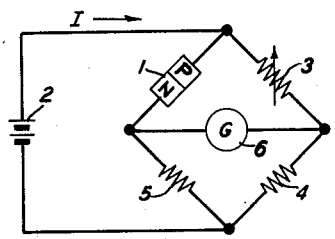
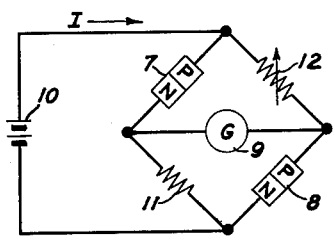
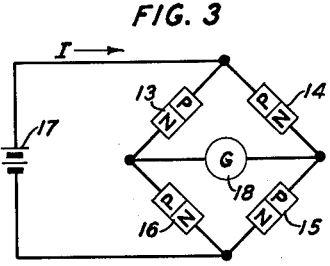
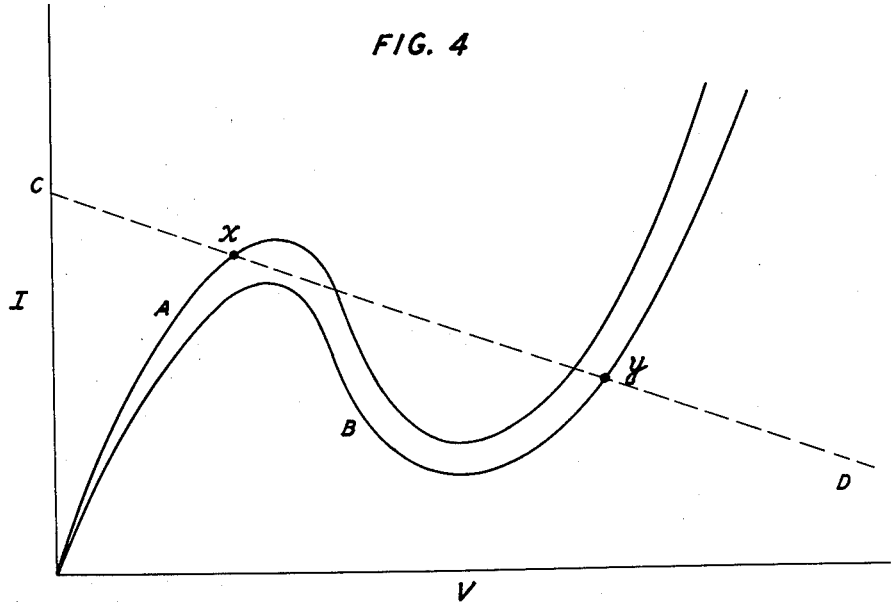
INVENTOR
W. G. PFANN
BY
George S. Indig
ATTORNEY Nov. 27, 1962   W. G. PFANN   3,065,636
PRESSURE TRANSDUCERS
Filed May 10, 1960   2 Sheets-Sheet 2

INVENTOR
W. G. PFANN
BY
ATTORNEY

3,065,636
PRESSURE TRANSDUCERS

William G. Pfann, Far Hills, N.J., assignor to Bell Telephone Laboratories, Incorporated, New York, N.Y., a corporation of New York
Filed May 10, 1960, Ser. No. 28,047
10 Claims. (Cl. 73—398)

This invention relates to a procedure and device for measuring pressure variations. More particularly it concerns measurement of pressure changes through the use of particular diodes by determination of changes in diode current induced by fluctuations in pressure levels. The diodes according to this invention are so-called "tunnel" diodes, i.e., diodes in which the predominant current generating mechanism is by internal field emission. Such diodes are characterized in that both the $n$ and the $p$ regions are so heavily doped that the Fermi energy level lies above the conduction band edge in the $n$ region and below the valence band edge in the $p$ region.

The tunnel effect in diodes has been found to be an extremely sensitive electrical phenomenon. The tunneling probability, that is, the propensity for electron flow to occur by tunneling rather than by conventional junction flow, is closely related to the barrier thickness and to the energy gap. It has further been found that both of these factors show variations with changes in pressure.

The present invention accordingly has for one of its objects the use of tunnel diodes as pressure transducers. The advantages of this method will become evident.

The peak diode current, or the current at a given small forward or reverse voltage, is approximately proportional to the tunneling probability, $p$, which can be derived from the following:

The probability, $p$, that an electron striking the upper edge of the filled band will pass through the forbidden band into the next allowed band can be expressed by:

$$p = \exp\left[-\frac{4\sqrt{2m^*}}{3\hbar F}(E)^{3/2}\right] \quad (1)$$

in which $m^*$ is effective electron mass, E is energy gap in ev., $\hbar$ is Planck's constant divided by $2\pi$, and F is the electric field in volts per centimeter. The barrier thickness, $t$, in angstroms is:

$$t \cong \frac{2E}{F} \quad (2)$$

If we denote by M the ratio of effective mass, $m^*$, to free electron mass, $m_0$, and substitute M and $t$ in Equation 1 we obtain:

$$p = \exp\left[-\frac{2\sqrt{2m_0}\, t\sqrt{EM}}{3\hbar}\right] \quad (3)$$

which can be written:

$$p = \exp.\ [-K\sqrt{M}\,t\sqrt{E}] \quad (4)$$

where again E denotes energy gap in electron volts, $t$ denotes barrier thickness in angstroms, M denotes ratio of effective mass to free mass of the electron, and $k$ is a constant, independent of the material, equal to 0.34.

When a hydrostatic pressure, P, is imposed, the tunnel probability, $p$, is affected in two ways (at least) namely, by a change in E, and by an change in $t$, caused by the compression. An expression for the fractional change in $p$, $\Delta p/p_0$, can be obtained as follows:

$$p_0 = \exp.\ [-k\sqrt{M}\,t_0\sqrt{E_0}] \quad (5)$$

where subscript zero denotes atmospheric pressure.

$$p_P = \exp.\ [-k\sqrt{M}\,t_P\sqrt{E_P}] \quad (6)$$

where subscript P denotes an added pressure, P.

$$E_P = E_0 + \frac{\delta E}{\delta P}(P) \equiv E_0 + BP \quad (7)$$

$$t_P = t_0\left(1 - \frac{\Delta t}{t_0}\right) = t_0\left(1 - \frac{1-2\sigma}{Y}P\right) \quad (8)$$

$$\cong t_0\left(1 - \frac{0.4}{Y}P\right) \quad (9)$$

where Y denotes Young's modulus, and $\sigma$ Poisson's ratio, which is about 0.3 for typical semiconductors, and B is a constant. From Equations 5 through 8 we obtain:

$$\frac{\Delta p}{p_0} = \frac{p_P}{p_0} - 1$$

$$= \exp.\left[-k\sqrt{M}\left\{t_0\left(1-\frac{0.4P}{Y}\right)\sqrt{E_0+BP} - t_0\sqrt{E_0}\right\}\right] - 1 \quad (10)$$

$$\frac{\Delta p}{p_0} = \exp.\left[-k\sqrt{M}\,t_0\sqrt{E_0}\left\{\left(1-\frac{0.4p}{Y}\right)\left(\sqrt{1+\frac{BP}{E_0}}\right)-1\right\}\right]-1 \quad (11)$$

Since the exponent as a whole, and $(BP/E_0)$ will generally be small, we may simplify Equation 11, using $$e^{-x} \cong 1-x \text{ and } \sqrt{1+y} \cong 1+(y/2)$$

$$\frac{\Delta p}{p_0} = -k\sqrt{M}\,t_0\sqrt{E_0}\left(\frac{B}{2E_0}-\frac{0.4}{Y}\right)P \quad (12)$$

The following values of the constants are appropriate for silicon and germanium:

| Constant | Si | Ge |
|---|---|---|
| $k$ | 0.34 | 0.34. |
| $\sqrt{M}$ | 0.60 | 0.44. |
| $E_0$ | 1.1 | 0.80 ev. |
| $B$ | $-1.5 \cdot 10^{-12}$ | $+5 \cdot 10^{12}$ ev.-dynes-cm.$^{-2}$ |
| $Y$ | $1.5 \cdot 10^{12}$ | $1.2 \times 10^{12}$ dynes-cm.$^{-2}$ |

Hence Equation 12 can be written as:

$$\left[\frac{\Delta p}{p_0}\right]_{Si} \cong +2.1 \times 10^{-13} t_0 P \quad (13)$$

$$\left[\frac{\Delta p}{p_0}\right]_{Ge} \cong -3.4 \times 10^{-13} t_0 P \quad (14)$$

in which $t_0$ is in angstroms and P is in dynes-cm.$^{-2}$.

A convenient number for comparisons is the value of $(\Delta p/p_0)$ at 1000 atmospheres ($10^9$ dynes/cm.$^2$). Letting $t_0$ be 100 angstroms, for example, we obtain:

$(\Delta p/p_0)$ Si, 1000 at. $\cong +0.021$ or 2.1%
$(\Delta p/p_0)$ Ge, 1000 at. $\cong -0.34$ or 3.4%

It is clear that $(\Delta p/p_0)$ depends on the barrier thickness, $t_0$, which can be controlled in fabrication. The pressure sensitivity increases as $t_0$, but at the same time $p$ and the attendant tunnel current decreases, hence there is an upper limit on $t_0$, determined when the tunnel current becomes small compared to the normal diode current at which time the device loses its "tunnel" diode character. A useful range of $t_0$ for germanium and silicon is from approximately 20 angstroms to approximately 200 angstroms. It is evident that a diode with a barrier thickness at the upper limit of 200 angstroms will double the sensitivity of the device as calculated above so that $$\left(\frac{\Delta p}{p_0}\right)$$

for a $\Delta P$ of 1000 atmospheres will result in a variaiton in tunneling probability and accompanying diode current of approximately 4.2 for silicon. This value is in excess of thirty times the sensitivity of ordinary resistance strain gauges.

The foregoing calculations are based only on changes in energy gap and barrier thickness with pressure. Other more subtle changes, all favoring increased sensitivity, may also occur under the influence of pressure, such as the decrease in the effective mass of certain groups of conduction electrons. Since our actually observed values of $$\left(\frac{\Delta p}{p_0}\right)$$

are considerably greater than those calculated from equation 12, it is evident that these effects are appreciable and experimental results, as will be seen, will reflect a greater sensitivity than that mathematically indicated.

A better understanding of the following modifications and discussion of the invention is perhaps obtainable through an examination of the accompanying drawing, in which:

FIG. 1 is a diagram of a bridge circuit appropriate for measuring current variation with pressure through a diode of this invention;

FIG. 2 is a diagram of a modified bridge circuit affording increased sensitivity;

FIG. 3 is a diagram of a further modification of a bridge circuit affording approximately four times the sensitivity obtainable from standard bridge circuits such as that of FIG. 1;

FIG. 4 is a typical plot of current versus voltage for a tunnel diode under two pressure conditions which allow the negative resistance characteristic to be utilized as a signal mechanism as hereinafter described;

Figure 5:
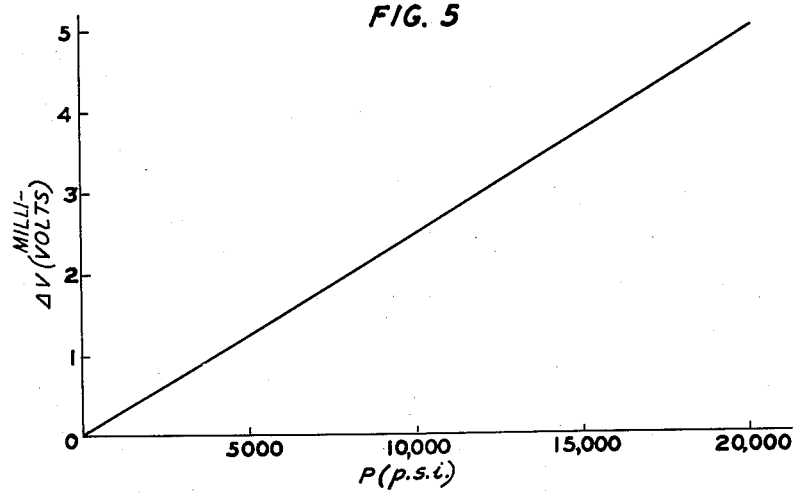
FIG. 5 is a plot of the change in voltage with pressure variations across a particular diode according to one specific embodiment of this invention.

FIG. 1 shows a tunnel diode 1 connected in a standard bridge circuit with a current supply 2, standard resistance elements 3, 4 and 5 and galvanometer 6. The galvonometer may be calibrated empirically to read pressures directly or indicated variations in current or voltage may be used to calculate P from equation 12.

FIG. 2 shows a similar bridge circuit having two tunnel diodes 7 and 8 connected so as to double the sensitivity of the galvanometer 9 to pressure variations. Again current source 10 and standard resistance elements 11 and 12 are employed.

FIG. 3 shows a further refinement of the bridge circuit. It will be noted from Equations 13 and 14 that germanium and silicon show coefficients of variation in tunneling probability with pressure which are opposite in sign. Consequently, this phenomenon can be exploited to further increase the sensitivity of the bridge circuit. Such an arrangement appears in FIG. 3 wherein all four legs of the bridge circuit contain diodes. In order for the current variation in all the diodes to be additive, two silicon diodes must occupy sites 13 and 15 or 14 and 16 with two germanium diodes in the remaining positions. Current source 17 and galvanometer 18 are employed. This circuit arrangement produces an aggregate current variation with pressure of approximately four times that obtainable with the ordinary bridge circuit utilizing a single diode. It is clear that other combinations of semiconductive materials which have coefficients relating tunneling probability to pressure which are opposite in sign may be utilized without departing from the scope of this invention.

Another modification of this invention makes use of the negative resistance area of the current-voltage characteristic of certain diodes, notably germanium, which is shown in FIG. 4. Curve A shows such a diode, under pressure. Curve B shows the same diode under a pressure elevated with respect to that of curve A. Since germanium shows a negative variation of tunneling probability with pressure, curve B is displaced below curve A. Consequently, if the diode is biased at a particular power level represented by the load line C, D, for instance, and the operating point is X, when the pressure is increased and the peak falls below the load line, the operating point is translated to point Y. The attendant sharp rise in voltage (or alternatively the drop in current) may be used to trigger a signal device or switch according to known means. Such a diode will then automatically indicate pressures exceeding a given value corresponding to the pressure value where the peak departs from the load line.

Figure 6:
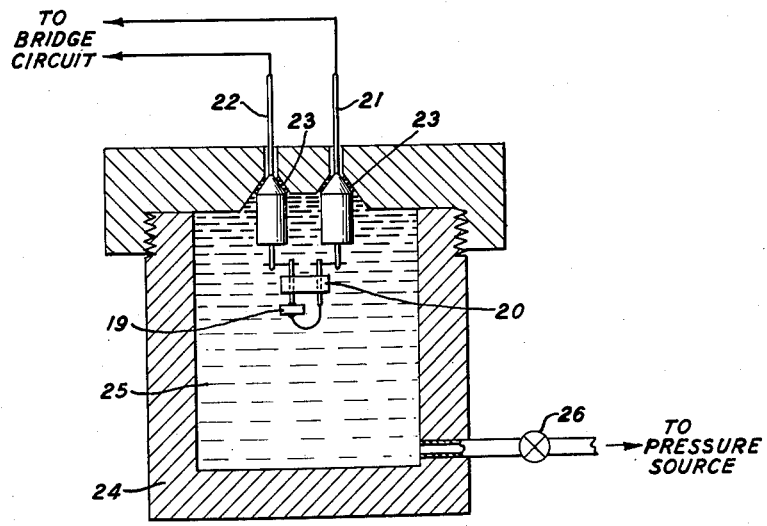
FIG. 6 is a schematic diagram, partly in section, of an appropriate apparatus used for obtaining the values plotted in FIG. 5.

The following specific embodiment is given as exemplary of the invention:

The apparatus used was that depicted in FIG. 6. A germanium tunnel diode indicated generally at 19 was made which consisted of 2% Ga—98% in alloy on an n-type semiconductor. Arsenic doped germanium was the semiconductor material which had a resistivity of $7.8 \times 10^{-4}$ ohm-cm. A 1-mil gold wire contacted the alloy dot. The diode was supported through a glass header 20 by copper-beryllium leads 21 and 22. These leads were then connected to a bridge circuit similar to that shown in FIG. 1. The leads extended through soapstone seals 23 in the cover of a steel bomb 24 containing a nonconducting hydrostatic pressure fluid 25, for instance, oil of low electrical conductivity. The bomb was connected to a pressure source through control valve 26. The bridge circuit employed a current source which was maintained constant at 6 milliamperes. The potentiometer recorded variations with pressure which are plotted in FIG. 5. The ordinate is change in voltage in millivolts, the abscissa is pressure in pounds per square inch. As is seen, a reliable linear relationship exists.

Actually the experimental results show a surprising degree of sensitivity which is well beyond that which would be expected from the foregoing calculations. This can perhaps be explained through other variables, such as the electron mass as mentioned previously, which may show significant variations with pressure which had not been predicted. From the graph of FIG. 5 it is seen that a variation in pressure of 1000 atmospheres resulted in a $\Delta V$ of 3.5 mv. Since in this particular example the starting voltage was 25.5 mv.;

$$\frac{\Delta V}{V_0} = \frac{3.5}{25.5} = .137$$

or a variation of 13.7%. This value is obviously well in excess of the 3.4% value predicted from Equation 14 for a 1000 atmosphere pressure variation. Consequently, experimental values show pressure sensitivities for tunnel diodes which compare favorably with piezoresistive devices which are among the most sensitive pressure gauges known.

Alternatively, in lieu of the steel bomb the diode may be encased in a thin, compressible shell containing the insulating fluid medium. This, of course, would allow the device to be immersed directly in the fluid where the pressure is desired to be measured even where the fluid is conductive.

It is obvious that this device may be employed to measure pressures of all types, it being necessary only to translate the pressure to the junction. Many arrangements will be apparent to those skilled in the art whereby pressures can be translated by various means to an appropriate tunnel diode junction and the current variation or change in resistance thereby measured.

It is further obvious that although FIG. 5 is plotted in terms of variations in voltage with pressure changes absolute values of pressures may be determined through the same procedure.

Although the variations in the diode due to the pressure being measured have been discussed in terms of diode current or in the specific embodiment as variations in voltage using a constant current, it is obvious that the parameter being varied can also be appropriately considered the resistivity of the diode. Of course, which parameter is measured is not of consequence since Ohm's law dictates that both the voltage and current will reflect linear variations with changes in resistivity of the diode. Accordingly, reference is made in the appended claims to measuring the resistivity of the diode. It is obvious that this encompasses measuring current or voltage and determining the resistivity by Ohm's law.

The linear variation of tunneling probability and attendant diode current at constant voltage with pressure changes has been found to be valid theoretically to extremely elevated pressures; however, the physical characteristics of the diode itself become limiting at around 30,000 atmospheres.

The advantages of the procedures for measuring pressure variations according to this invention are its extreme sensitivity over a broad range of pressures (.1 atmosphere to 30,000 atmospheres) which compares favorably with the most sensitive devices now being used; the durability, simplicity and ease of fabrication of the device; the rate of response of the device; its relative insensitivity to radiation and surrounding atmospheric contaminations and, perhaps most significantly, its comparatively extreme insensitivity to temperature variation.

What is claimed is:

1. A pressure transducer comprising a tunnel diode, means for subjecting said diode to a pressure desired to be measured such that the said pressure is transmitted to the junction of said diode and means connected to said diode for measuring the resistivity of the diode as a function of said pressure.

2. The device of claim 1 wherein the diode exhibits a negative coefficient of variation of tunneling probability with pressure.

3. The device of claim 1 wherein the diode exhibits a positive coefficient of variation of tunneling probability with pressure.

4. A pressure responsive switch comprising a tunnel diode, means for biasing said diode to a point below the peak current value of the diode at a given power level, means for subjecting the junction of said diode to a variation in pressure such that the given power level lies above the peak current value of the diode thereby switching said diode from a first resistance state to a second resistance state and signal means connected to said diode and actuated according to the resistance state of the diode.

5. A pressure responsive switch comprising a tunnel diode, means for biasing said diode to a point above the peak current value of the diode at a given power level, means for subjecting the junction of said diode to a variation in pressure such that the given power level lies below the peak current value of the diode thereby switching said diode from a first resistance state to a second resistance state and signal means connected to said diode and actuated according to the resistance state of the diode.

6. The device of claim 2 wherein the diode is a germanium tunnel diode.

7. The device of claim 3 wherein the diode is a silicon tunnel diode.

8. The device of claim 1 wherein said resistivity measuring means comprises a standard Wheatstone bridge circuit.

9. A pressure transducer comprising in combination two diodes, each characterized in that its predominant current generating mechanism may be by internal field emission, means including a modified bridge circuit for electrically biasing said diodes in separate arms on the same potential side of the bridge, means for subjecting the junctions of said diodes to a pressure desired to be measured and means including said modified bridge circuit for measuring the collective resistivity of both diodes as a function of said pressure.

10. A device for measuring pressure which comprises a modified bridge circuit, said circuit containing a current source, two pairs of diodes connected in parallel legs and a galvanometer connecting each leg between each of said pairs, said two pairs of diodes consisting of a pair having negative and a pair having positive coefficients of varation of tunneling probability with pressure, each of said two pairs of diodes being subjected to the pressure to be measured, each of said diodes being characterized in that its predominant current generating mechanism is by internal field emission, and said circuit being arranged such that each of said pairs occupies opposite potential sides.

References Cited in the file of this patent

UNITED STATES PATENTS 2,969,514    Curtis _____ Jan. 24, 1961